United States Patent Office 3,297,655
Patented Jan. 10, 1967

3,297,655
PIPERIDINO-POLYCARBONAMIDES
Francis E. Cislak, 1615 Merchants Bank Bldg.,
11 S. Meridan St., Indianapolis, Ind. 46204
No Drawing. Filed May 10, 1965, Ser. No. 454,639
6 Claims. (Cl. 260—78)

This application is a continuation-in-part of copending application Serial No. 194,687, filed May 14, 1962, now abandoned.

My invention relates to new polymers. More particularly, it relates to new polycarbonamides which have recurring in their molecular make-up the moiety:

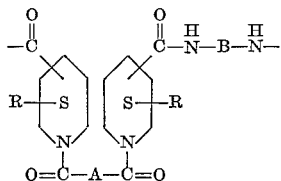

wherein R represents hydrogen or lower alkyl; A represents an alkylene radical, an alkenylene radical (such, for example, as the maleic acid radical, the fumaric acid radical, the citraconic acid radical, the glutaconic acid radical, and the like) or an arylene radical (such, for example, as the phthalic acid radical, the isophthalic acid radical, the terephthalic acid radical, the naphthalic acid radical, the dinicotinic acid radical, the iso-cinchomeronic acid radical, and the like); B represents the radical —$(CH_2)_n$— wherein $n$ is a small whole number from 2 to 8, the phenylene radical, or the radical

In general my piperidino-polycarbonamides may be prepared by reacting a bis-carboxypiperidide with a diamine. The reaction may be carried out by heating the bis-carboxypiperidide and the diamine above the melting point of the resulting polymer; the reaction is usually pushed to completion by removing the last traces of water under high vacuum. In some instances it is preferred to use as starting materials a diamine and an ester of the bis-carboxypiperidide.

My piperidino-polycarbonamides are normally solid. They are insoluble in water but are soluble in formic acid and acetic acid. They are not soluble in the common organic solvents, such as benzene, cyclohexane, carbon tetrachloride, and the like.

My piperidino-polycarbonamides may be formed into fibers, films, and molded articles. The presence of the piperidine rings in the polymer chain imparts a rigidity, a useful property for making nylon-type tire cords.

The bis-carboxypiperidides used in the preparation of my new polyamides are new compounds. They are the subject of U.S. patent application Serial No. 404,916 filed October 19, 1964, now U.S.P. 3,210,359. These bis-carboxypiperidides are prepared by heating, at temperatures above about 100° C., and preferably above about 150° C., a piperidine-carboxylic acid with a dibasic acid, or a di-ester of a dibasic acid.

To illustrate the manner in which may invention may be practiced, I cite the following examples. These are given by way of illustration only and are not intended as a limitation of my invention.

EXAMPLE 1

Polyamide of hexamethylenediamine and adipyl-bis-(4,4'-carboxypiperidide)

A mixture of 120 grams of hexamethylene diamine and 358 grams of adipyl-bis-(4,4'-carboxypiperidide) is placed into a high pressure autoclave equipped with a stirrer and a means for controlled heating. The air in the autoclave is displaced with nitrogen by evacuating the autoclave, filling with nitrogen, and again evacuating. The autoclave is now closed, the stirrer is started, and the temperature of the mixture in the autoclave gradually raised to about 200–225° C. The mixture is heated at this temperature overnight (16 hours). Then the autoclave is opened, and the mixture heated under atmospheric pressure at about 250°–275° C. for about one hour. The resulting polymer, while still hot, is poured into a shallow pan and allowed to cool. The softening point of the polymer is above about 100° C. It is insoluble in water, benzene, and hexane. It is soluble in formic acid and acetic acid.

The polyamide is characterized by having recurring in its molecular make-up the moiety:

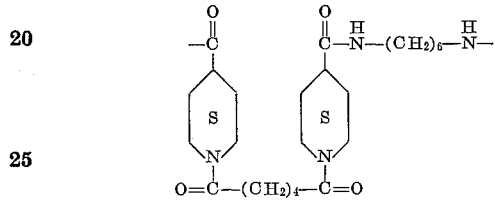

EXAMPLE 2

Polyamide of p-phenylene diamine and phthalyl-bis-(3,3'-carboxypiperidide)

The procedure of Example 1 is followed with the exception that 110 grams of p-phenylene-diamine is used in place of the hexamethylene diamine and 378 grams of phthalyl-bis-(3,3'-carboxypiperidide) is used in place of the adipyl-bis-(4,4'-carboxypiperidide).

The polyamide is characterized by having recurring in its molecular make-up the moiety:

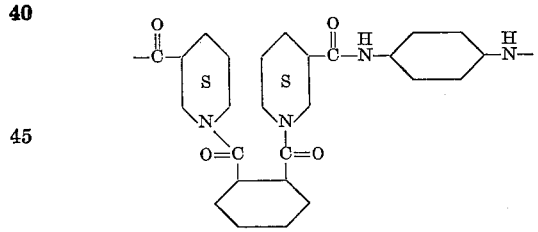

The polyamide has a softening point above about 150° C.

EXAMPLE 3

Polyamide of hexamethylenediamine and terephthalyl-bis-(4,4'-carboxypiperidide)

The precedure of Example 1 is repeated with the exception that 378 grams of terephthalyl-bis-(4,4'-carboxypiperidide) is used in place of the adipyl-bis-(4,4'-carboxypiperidide).

The polyamide is characterized by having recurring in its molecular make-up the grouping:

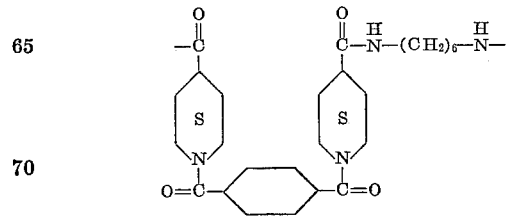

EXAMPLE 4

*Polyamide of hexamethylenediamine and adipyl-bis-(3, 3'-carboxypiperidide)*

The procedure of Example 1 is repeated with the exception that adipyl-bis-(3,3'-carboxypiperidide) is used in place of the adipyl-bis-(4,4'-carboxypiperidide).

The polyamide is characterized by having recurring in its molecular make-up the grouping:

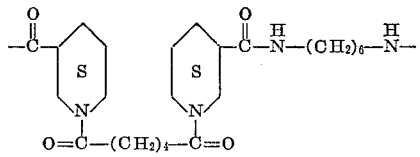

EXAMPLE 5

*Polyamide of hexamethylenediamine and phthalyl-bis-(4,4'-carboxypiperidide)*

The procedure of Example 1 is repeated with the exception that 378 grams of phthalyl-bis-(4,4'-carboxypiperidide) is used in place of the adipyl-bis-(4,4'-carboxypiperidide).

The polyamide is characterized by having recurring in its molecular make-up the moiety:

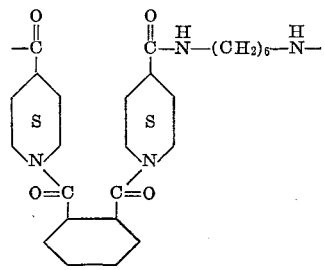

EXAMPLE 6

*Polyamide of hexamethylene diamine and maleic acid-bis-(4,4'-carboxypiperidide)*

The procedure of Example 1 is repeated with the exception that 328 grams of maleic acid-bis-(4,4'-carboxypiperidide) is used in place of the adipyl-bis-(4,4'-carboxypiperidide).

The polyamide is characterized by having recurring in its molecular make-up the moiety:

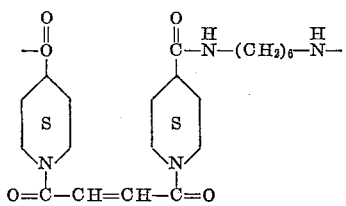

EXAMPLE 7

*Polyamide of octamethylenediamine and adipyl-bis-(4,4'-carboxypiperidide)*

The procedure of Example 1 is repeated with the exception that 144 grams of octamethylene diamine is used in place of the hexamethylenediamine.

The polyamide is characterized by having recurring in its molecular make-up the moiety:

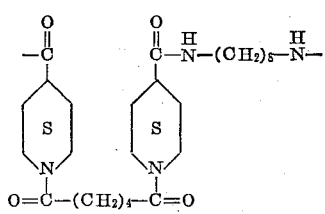

EXAMPLE 8

*Polyamide of ethylenediamine and adipyl-bis-(4,4'-carboxypiperidide)*

The procedure of Example 1 is repeated with the exception that 60 grams of ethylenediamine is used in place of the hexamethylenediamine.

The polyamide is characterized by having recurring in its molecular make-up the grouping:

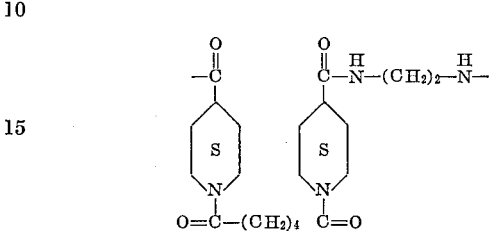

Other polyamides may be made in accordance with the above procedure, such for example, as those from:

hexamethylenediamine and adipyl-bis(3,3'-methyl-5,5'-carboxypiperidide),
decamethylenediamine and glutaryl-bis-(2,2'-carboxypiperidide),
hexamethylenediamine and azela-bis-(4,4'-carboxypiperidide),
tetramethylenediamine and naphthalene-2,6-dicarbox-bis-(4,4'-carboxypiperidide).

I claim as my invention:

1. Piperidino-polycarbonamides of a bis-carboxypiperidide having the formula

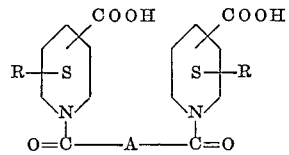

wherein R represents a member of the class consisting of hydrogen and lower alkyl and A represents a member of the class consisting of alkylene, alkenylene, and arylene; and a diamine of the formula $H_2N—B—NH_2$ wherein B represents a member of the class consisting of the radical $—(CH_2)_n$ wherein $n$ is a small whole number from 2 to 8, the phenylene radical, and the radical

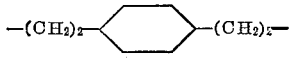

2. Polycarbonamide of hexamethylene diamine and adipyl-bis-(4,4'-carboxypiperidide).
3. Polycarbonamide of hexamethylene diamine and adipyl-bis-(3,3'-carboxypiperidide).
4. Polycarbonamide of hexamethylene diamine and terephthalyl-bis-(4,4'-carboxypiperidide).
5. Polycarbonamide of hexamethylene diamine and phthalyl-bis-(4,4'-carboxypiperidide).
6. Polycarbonamide of hexamethylene diamine and maleic acid-bis-(4,4'-carboxypiperidide).

References Cited by the Examiner

UNITED STATES PATENTS 3,197,442   7/1965   Kramer et al. _____ 260—78
3,210,359   10/1965  Cislak et al. _____ 260—78

WILLIAM H. SHORT, *Primary Examiner.*

SAMUEL H. BLECH, *Examiner.*

H. D. ANDERSON, *Assistant Examiner.*